Figure 1:
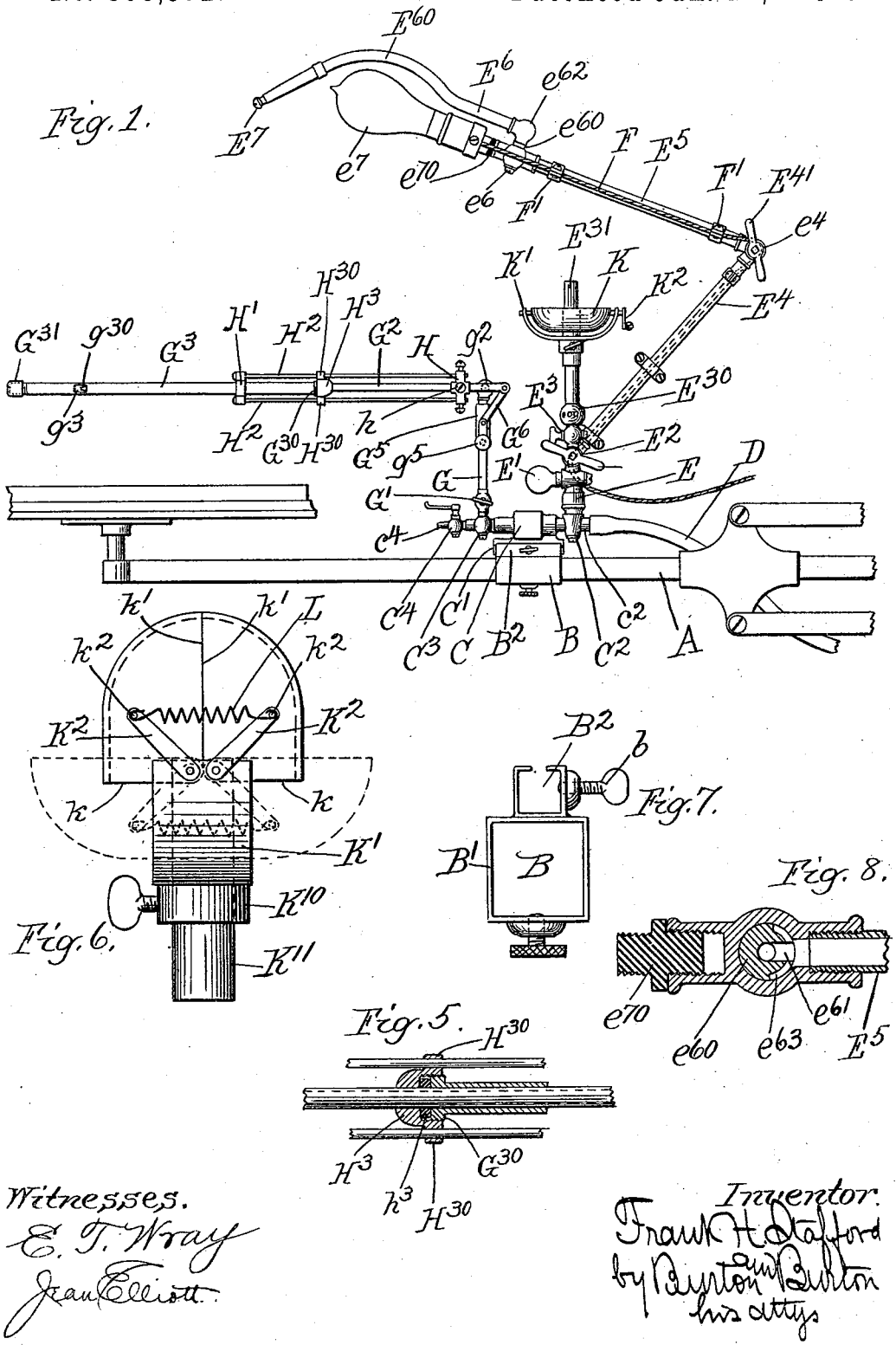
Figure 2:
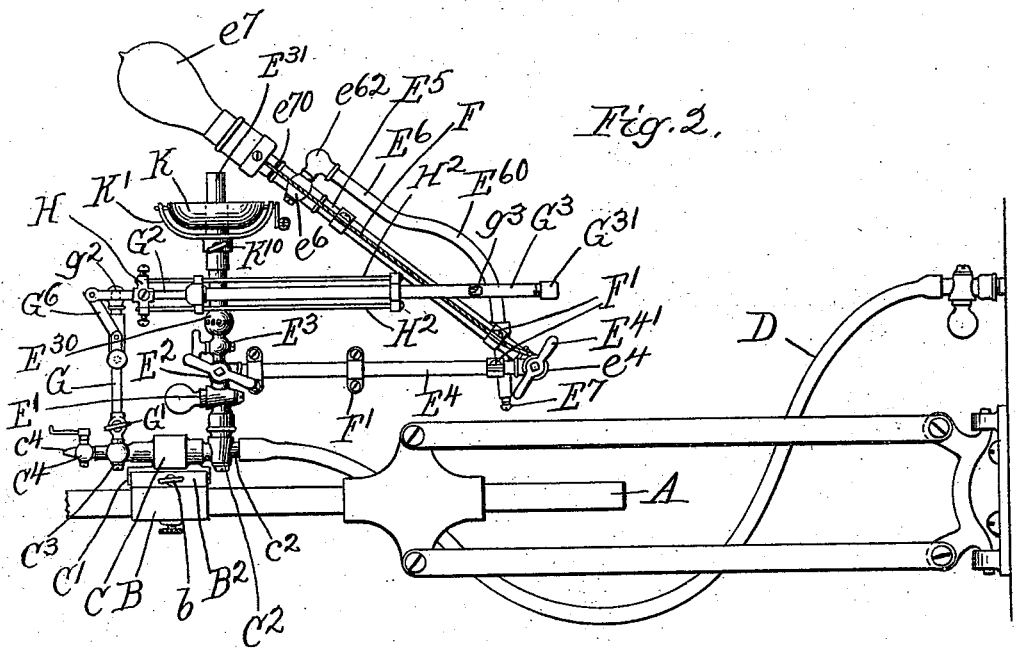

(No Model.) 2 Sheets—Sheet 2.

F. H. STAFFORD.
DENTAL LIGHT AND HEATER.

No. 553,572. Patented Jan. 28, 1896.

Witnesses.
E. T. Wray.
Jean Elliott

Inventor.
Frank H. Stafford
by Burton Burton
his attys

UNITED STATES PATENT OFFICE.

FRANK H. STAFFORD, OF CHICAGO, ILLINOIS.

DENTAL LIGHT AND HEATER.

SPECIFICATION forming part of Letters Patent No. 553,572, dated January 28, 1896.

Application filed May 27, 1895. Serial No. 550,785. (No model.)

*To all whom it may concern:*

Be it known that I, FRANK H. STAFFORD, a citizen of the United States, residing at Chicago, county of Cook, and State of Illinois, have invented certain new and useful Improvements in a Dental Light and Heater, which are fully set forth in the following specification, reference being had to the accompanying drawing, forming a part thereof.

This invention is intended to provide an apparatus for the use of dentists, comprising a light adjustable at the dental chair without requiring the operator to leave his working position, and, connected therewith, heating devices suitable, respectively, for the several applications which are sometimes necessary in the course of dental work, such as annealing metal and softening impression material or other plastic substance employed in different dental processes, so that the dental operator can perform all these processes without leaving his working position at the chair.

The invention consists in the several details of construction specified in the claims.

The drawing is a general perspective view of the devices constituting my invention in operating position, attached to the arm of the ordinary dental bracket.

My entire device is intended to be adjustably supported on the horizontal arm of a dental bracket, of which various forms are in use, a familiar one being shown in the drawings. A is such horizontal arm of the dental bracket.

The dental brackets in use have variously-shaped arms, and in order that my device may be easily applicable to any of them, I employ a clip B, comprising a slide tube or sleeve B' at the lower side, the shape of which conforms to the particular bracket to which it is intended to be attached, the upper portion of the clip having a horizontal seat or slideway $B^2$, at which the central or base fitting of my device is attached. This clip B will be made in various patterns to correspond to the shapes of the various dental brackets in common use, and the necessity for making it in various forms for this purpose is the reason for providing it as a separate fitting or part detachable from the remainder of the base-fitting, so that such base-fitting may be the same in all cases, the changeable part being one of small cost.

C is the part which I term the "base-fitting." It is of the nature of a gas-pipe fitting, and has, at the lower side, the slide-rib C', which fits in the socket or sleeve $B^2$, and may be secured therein by the set-screw $b$. It comprises also the swivel gas-joint $C^2$ at one side and the smaller swiveled joint $C^3$ at the other side of the central portion, and it may have, also, beyond the swivel-joint $C^3$, a small gas-valve or turn-cock $C^4$, terminating in a tapering nipple $c^4$ for the attachment of a flexible tube. Outside the swivel-joint $C^2$ is a nipple $c^2$ for the attachment of a flexible gas-pipe D, which leads to any source of gas at the wall on which the dental bracket A is secured. At the swivel-joint $C^2$ is seated and adapted to rotate about a vertical axis the upright fitting E, comprising a turn-cock E', a gas-pipe hinge-joint $E^2$, and at the upper side of the latter a nipple for the attachment of the turn-cock $E^3$. At the hinge-joint is connected a length of gas-pipe $E^4$, joined at the hinge $e^4$ to another length $E^5$, near the outer end of which is swiveled the terminal gas-pipe $E^6$, which terminates in a burner at $E^7$. The swivel-joint at $e^6$ is also of the nature of a valve, the center spindle being like the spindle of an ordinary turn-cock, except that the gasway $e^{61}$ instead of penetrating the spindle transversely leads in from one side to the center and thence axially upward to the center of the globe $e^{62}$ and thence radially outward. Through the boss at which the terminal pipe $E^6$ is attached a groove $e^{63}$ on the surface of the spindle $e^{60}$ extends a few degrees on the surface each way from the radial passage $e^{61}$, so that the burner-carrying arm $E^6$ may be rotated through a few degrees without cutting off the gas. The groove may extend ninety degrees each way from the radial opening $e^{61}$, allowing, before the gas is cut off and the light extinguished, a swing of one hundred and eighty degrees to the burner from a middle position in line with the pipe $E^5$. The fitting in which the swivel-joint and valve $e^6$ is formed is of the nature of a T, the cross-arm being in the direction of a pipe $E^5$ and the stem being the spindle $e^{60}$, and into the remote end of the cross-arm is screwed a plug $e^{70}$, adapted for the attachment of an incandescent electric lamp $e^7$, which when attached projects in the direction of the arm $E^5$. The terminal gas-pipe $E^6$, carrying the gas-burner, is curved, as shown at $E^{60}$, to pass the swell of the electric lamp $e^7$, and then continues substantially in the direction of a tangent to the curve, so that the burner $E^7$ projects outward in the direction in which the electric lamp points and obliquely downward.

F is the electric-lamp wire, which may lead from any permanent fixture on the wall from which the gas connection proceeds. On account of the joints in gas-pipe, and particularly on account of the shut-off swivel at $e^6$, it is not desirable to construct a fixture which shall conceal the electric-light wire lest it should thereby be made cumbersome, and in order to prevent the wire from appearing slovenly by drooping in the loops, or, on the other hand, being liable to strain by being drawn too tightly at certain positions of the fixture, I make provision, which I will now describe, for conducting and supporting this wire on the outside of the gas-fixture just described.

On the arms $E^4$ and $E^5$, I secure two-part clips F' F', &c., adapted to be clamped together about the pipe and forming between them when thus clamped an eye $F^{10}$ of sufficient size to permit the electric-light wire to reeve freely through it. The first of these clips is secured quite close to the joint $E^2$, and the wire preferably passes under that joint, wrapping half-way about the pulley $E^{20}$, which is journaled on the spindle of the joint, and passes thence through the eye of the first clip F', thence through any suitable number of similar clips on the arm $E^4$ and around the pulley $e^{40}$ at the joint $e^4$, and then through similar clips F' on the arm $E^5$, being guided thus to the lamp $e^7$.

Figure 3:
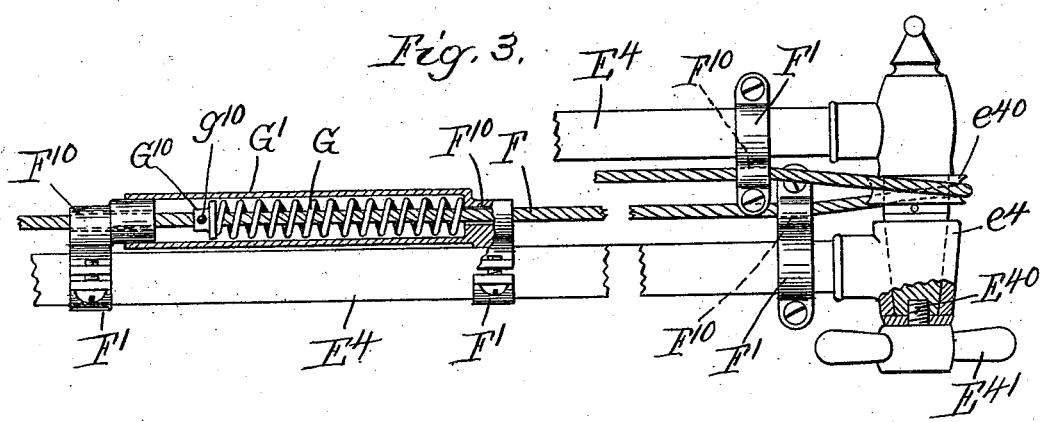
Figure 4:
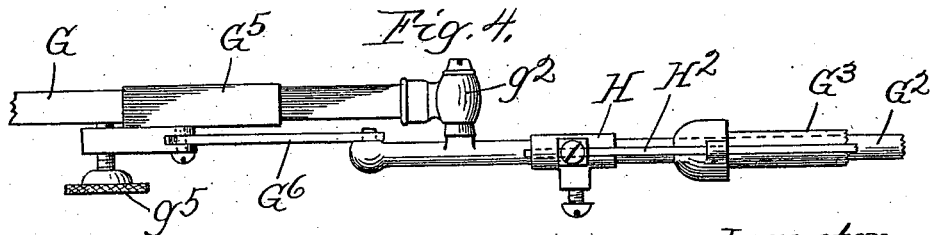

When the arm $E^5$ is folded back out of operative position, the cord would be slack and would hang in a loop about the pipe-joint at $e^4$ and would be liable to slip off the same and appear slovenly if provision were not made for taking up the slack. Such provision I have shown, consisting of the spring G, inclosed in a sleeve G', which is secured at its ends to two of the clips F', preferably on the arm $E^4$. The electric-light wire passes through the sleeve and through the spring therein, and the lower end of the latter is made fast to the wire by means of a collar $G^{10}$, which terminates the spring and which is adapted to be clamped by any suitable means, as the screw $g^{10}$, onto the wire. The spring, fully extended, takes up all the slack of the wire at the position of the fixture which throws the greatest amount of slack—that is, when the lamp is reversed out of ordinary operative position and the length of the spring and its resiliency are such that it yields to afford enough wire to pass freely around both the joints when the lamp is folded in the position to require the most wire. The position shown in Fig. 1 is the most frequent position, and the lamp will seldom be used in a position requiring more wire than that. In order that the lamp may be secure in any position to which it may be adjusted by means of the joints $E^2$ and $e^4$, these joints must be tight enough to not yield under the weight of the lamp and pipe. To insure this result I prefer to change the ordinary structure of such joints simply by making the clamp-screw which tightens the joint in the form which is clearly shown in Fig. 3, wherein the joint shown is the one at $e^4$, $E^{40}$ being the clamp-screw, and $E^{41}$ a large handle with which it is provided for the purpose of tightening the joint to any necessary degree. It will be understood that the structure at the joint $E^2$ is precisely similar.

In dental work at the chair the operator has occasion frequently to use a small amount of heat to soften the plastic material with which he works in taking impressions and performing other similar processes, and it is important to be able to do this without leaving the chair, because the material must be used so quickly after being warmed. It is also important that the devices employed for this purpose should not be in the way of the operator or in position in which he would be liable to reach over the flame during his work, because the burning of the hands or clothing would be a probable result. Heretofore it has been customary to employ either a small gas-stand or heating-burner on a base, or an alcohol-lamp, either device being placed on the customary tablet or tray carried at the end of the arm A of the dental bracket. Care is necessary to avoid getting in the way of the flame of such a heater while operating, and in practice it is more convenient to extinguish it and relight it each time it is used. To avoid these inconveniences I provide the heating-burner which is mounted at the swivel-joint $C^3$.

G is a vertical pipe extending from the swivel $C^3$, a turn-cock G' being interposed at the lower end.

$G^2$ $G^3$ are telescoping horizontal pipes, the first of which is hinged by an ordinary gas-joint at $g^2$ to the upper end of the pipe G. The pipe G is preferably square, and on it is a square sleeve $G^5$, adapted to slide up and down upon it. The pipe $G^2$ projects beyond the hinge-joint at $g^2$, and at the projecting (closed) end is connected by a link $G^6$ to the sleeve $G^5$, and a set-screw $g^5$ serves to secure the sleeve in any position to which it may be adjusted vertically on the pipe G, and by sliding the sleeve on the pipe the telescoping pipes $G^2$ $G^3$ may be set at an inclination from vertical to horizontal, and by sliding the sleeve down to the limit, so that the link $G^6$ is vertical, the pipes $G^2$ $G^3$ may be reversed about the pivot $g^2$ and folded back entirely out of the way. The pipe $G^3$ is made to serve as a gas-mixer or mixing-burner, being apertured at $g^3$ a short distance back of the end, and having set into it a small gas-nozzle $g^{30}$, which delivers a jet of gas centrally through the pipe, drawing air through the apertures $g^3$ in a manner well understood. A gauze cap $G^{31}$ at the end prevents lighting back to the nozzle $g^{30}$.

In order that the telescoping-arm of the pipes $G^2$ $G^3$ may not be unduly heavy, I desire to avoid making the outer of those pipes any larger than necessary to adapt it to permit the inner pipe, $G^2$, to be telescoped within it. This prevents the employment of any interior stop on the outer pipe, and to effect such stoppage otherwise, and so to retain the minimum size of pipe, I mount a cross-head H on the inner pipe, securing it by a set-screw $h$ near the joint $g^2$, and on the outer pipe I mount a similar cross-head adapted to slide freely on said pipe, and I connect said cross-heads by the light rods or wires $H^2$ $H^2$, and I provide the outer pipe, $G^3$, with a terminal hub or flange $G^{30}$ at the inner end, which serves as a stop for the sliding cross-head H', and I make the length of the rods $H^2$ $H^2$ such that when the cross-head H is secured at the innermost limit on the pipe $G^2$ this stop flange $G^{30}$ will collide with the sliding cross-head H' while the two pipes are still telescoped a sufficient distance to secure a proper joint. For the purpose of packing this joint to make it gas-tight, I make a stuffing-box $H^3$, which is adapted to slide on the pipe $G^2$ and to hold a rubber gasket $h^3$, and which is interiorly threaded at the outer end to receive the flange $G^{30}$, which is peripherally threaded to fit said stuffing-box. The stuffing-box may also have lugs $H^{30}$ at opposite sides, pierced to run on the wires $H^2$ $H^2$, but this is not essential.

A dental operator has frequent occasion in doing work which requires the use of metals—as for filling teeth, fitting plates, &c.—to soften or anneal the metal to be used in his work. This requires a greater heat than should be provided merely for the purpose of softening material for taking impressions, &c., and usually the operator repairs to the laboratory to prepare the metal, and in the course of a single sitting he may be obliged frequently to repeat this process, involving considerable loss of time. I provide, therefore, in connection with my device, a heating-burner suitable for annealing the metals used, so that this can be done without leaving the operating-chair. For this purpose the fitting which has the turn-cock $E^3$, and which is secured to the upper side of the hinge-joint $E^2$, comprises above the valve a mixer $E^{30}$, adapted to receive at its upper end a terminal tube or burner $E^{31}$, from the upper end of which will issue, when the gas-passage is open, an air-mixed gas-current capable of producing a sufficiently-strong flame to serve the purpose of annealing.

Since the whole apparatus will be near the patient occupying the chair, and is liable to be in position overhanging the clothing, the accidental dropping of the fragments of melted, or even highly-heated metal would be very damaging. I therefore provide a tray K, supported, as hereinafter described, in a yoke K', whose hub $K^{10}$ is extended a short distance upward and downward in a sleeve $K^{11}$, adapted to slip onto the burner-tube $E^{31}$, the sleeve stopping at its lowest position on the globe of the mixer. This tray, which is preferably substantially in the shape shown—bell-shaped or upwardly concave—will catch any melted particles which may fall while the operator is heating metal in the flame at the upper end of the burner-tube. Neatness is a prime essential in all dental operations, and such a tray might be liable to accumulate fragments and ashes, which would be more or less inconvenient to remove if the tray were integral, and to prevent such a result I prefer to divide the tray diametrically, pivoting the two halves at their upper corners near the diametrical division plane, such pivots obtaining bearing in the upper ends of the yoke K', providing the pivots at one end with crank-arms $K^2$ $K^2$, which, when the tray is in operative position with the two halves in contact at the diametrical division plane, stand each at an angle of forty-five degrees downward from a horizontal plane, and I connect the wrists $k^2$ of the crank-arms $K^2$ by an extensible coiled spring L, which is easily extended sufficiently to permit the arms to extend horizontally as the two halves of the tray are swung upward, and when said two halves meet or are folded together, their upper edges, which are horizontal in operative position, meeting at a vertical plane midway between their pivots, the crank-arms $K^2$ are again standing at an angle of forty-five degrees, but above instead of below the horizontal, and the spring therefore tends to hold the tray either with the edges $k$ $k$ in contact, which is the operative position, or with the edges $k'$ in contact, which is the inoperative position. In this latter position it will be observed that the tray is open downwardly and will empty its entire contents in being brought into this position. There is thus provided a very easy means of instantly emptying the tray, and it will be left in this position (shown in Fig. 6) always when not in use, being thrown down to the other position (shown in Fig. 1) when the operator is using the burner for heating metals.

I claim—

1. In combination with a folding gas bracket, a terminal suitable for attaching an incandescent electric lamp socket; clips for the support of the electric lamp wire mounted exteriorly on the folding arms respectively, said clips each provided with an eye through which the wire may pass freely; a guide pulley or seat for the wire on the spindle of the folding joint, the wire passing through the eyes of the clips and over such guide pulley or seat, and a slack take-up spring stopped at one end on the inner of the folding arms, and connected at the other end to the wire alongside such arm, and adapted to be put under tension when the bracket is folded in direction to increase the length of wire necessary, and to react from such tension to take up the slack when the bracket is straightened or folded in the opposite direction.

2. In combination with a folding gas bracket, provided with a terminal suitable for the attachment of an electric lamp socket, the lamp wire provided with a suitable guide on the outer arm near the folding joint; a sleeve mounted on the inner arm, and a spring coiled within the sleeve, the wire passing longitudinally through such sleeve and spring, one end of the spring being stopped on the sleeve and the other end made fast to the wire: substantially as and for the purpose set forth.

3. In combination with a gas bracket comprising the swiveled arm $E^6$, the swivel joint of which is adapted to operate as a valve to cut off the gas supply through a part of the range of motion of said arm about such swivel joint, the bracket being provided beyond the swivel joint with a terminal suitable for the attachment of an electric lamp socket, and clips mounted on the bracket provided with eyes to receive and guide the lamp wire on the exterior: substantially as set forth.

4. In a dental light and heater, in combination with the gas fitting C, provided with the slide-rib C', the clip B having the slide-way $B^2$ adapted to afford slide-bearing for the rib, and having the sleeve B' adapted to slide on the arm of the dental bracket: substantially as set forth.

5. In a dental light and heater, in combination with a base fitting adapted to be adjustably secured to the arm of a dental bracket, a folding gas bracket swiveled to said fitting, and a gas mixing burner adapted to afford heat for annealing dental metals, mounted vertically above the base fitting, and a second heating gas fixture also swiveled to the base fitting, carrying a mixing burner and adapted to extend to a distance horizontally from the base fitting: substantially as set forth.

6. In combination with the base fitting C, the upright pipe G, swiveled at the lower end to said fitting, a horizontal pipe connected by a gas hinge joint to the upper end of said vertical pipe, the hinged pipe being extended beyond the pivot; the sleeve $G^5$ adapted to slide on the pipe G, and the link which connects said sliding sleeve to the extended end of the hinged pipe, and suitable means for clamping the sleeve to the vertical pipe: substantially as set forth.

7. In combination, substantially as set forth, the telescoping pipes $G^2$ and $G^3$; the stuffing box $H^3$ adapted to slide on the smaller pipe, the larger pipe having a peripherally threaded terminal boss or flange adapted to screw into the mouth of the stuffing box, and suitable compressible gasket interposed in said stuffing box, whereby the telescoping joint may be made gas-tight at all positions.

8. In combination, substantially as set forth, the telescoping pipe $G^2$ $G^3$; the cross-head H fast on the inner pipe, and the cross-head H' adapted to slide on the outer pipe; and rods which connect said cross-heads, the outer pipe being provided with an exterior boss or flange at the inner end, adapted to stop against the cross-head H' at the limit of extension of the telescoping joint permitted by the length of the rods which connect the cross-heads.

9. In combination, substantially as set forth, the gas burner tube $E^{31}$, and a two-part tray whose similar parts are pivotally supported, respectively, at their proximate upper corners; crank wrist pins rigid with said two parts respectively, and located between the vertical division plane and the upper marginal plane of the tray, and an extensible spring connecting said wrist pins; whereby the spring tends to hold the tray either with its divided parts in contact at the divisional plane and upwardly open, or with said parts upturned and downwardly open.

10. In combination, substantially as set forth, the gas burner tube $E^{31}$, a yoke extending transversely with respect to the length of the tube, having its opposite ends upturned; a two-part tray having its two parts pivoted at their proximate upper corners to the upturned ends of the yoke; cranks rigid with the pivots of the parts at one end and extending obliquely from the pivots between the divisional plane and the upper marginal plane, and a spring connecting the cranks adapted to hold the tray extended and upwardly open or folded up and downwardly open.

In testimony whereof I have hereunto set my hand, in the presence of two witnesses, at Chicago, Illinois, this 21st day of May, 1895.

FRANK H. STAFFORD.

Witnesses:
CHAS. S. BURTON,
JEAN ELLIOTT.